(12) United States Patent
Kim

(10) Patent No.: US 12,295,518 B2
(45) Date of Patent: May 13, 2025

(54) POUR OVER COFFEE EXTRACTION DEVICE

(71) Applicant: MANO KOREA CO., LTD., Suwon-Si (KR)

(72) Inventor: Yeon-Soo Kim, Hwaseong-Si (KR)

(73) Assignee: MANO KOREA CO., LTD., Suwon-Si (KR)

( * ) Notice: Subject to any disclaimer, the term of this patent is extended or adjusted under 35 U.S.C. 154(b) by 814 days.

(21) Appl. No.: 17/620,404

(22) PCT Filed: Jun. 17, 2020

(86) PCT No.: PCT/KR2020/007863
§ 371 (c)(1),
(2) Date: Dec. 17, 2021

(87) PCT Pub. No.: WO2020/256417
PCT Pub. Date: Dec. 24, 2020

(65) Prior Publication Data
US 2022/0346589 A1    Nov. 3, 2022

(30) Foreign Application Priority Data
Jun. 18, 2019  (KR) .......................... 10-2019-0072024

(51) Int. Cl.
*A47J 31/06* (2006.01)
*A47J 31/00* (2006.01)
*A47J 31/44* (2006.01)

(52) U.S. Cl.
CPC ......... *A47J 31/061* (2013.01); *A47J 31/4403* (2013.01); *A47J 31/002* (2013.01)

(58) Field of Classification Search
CPC ..... A47J 31/002; A47J 31/061; A47J 31/4403
See application file for complete search history.

(56) References Cited

U.S. PATENT DOCUMENTS

| | | | | |
|---|---|---|---|---|
| 4,662,271 | A * | 5/1987 | Woltermann | A47J 31/402 99/295 |
| 5,865,094 | A * | 2/1999 | Kealy | A47J 31/007 141/340 |
| 8,910,563 | B2 * | 12/2014 | Hulett | A47J 31/4475 99/280 |
| 9,596,956 | B2 * | 3/2017 | Hughes | A47J 31/465 |
| 9,808,114 | B1 * | 11/2017 | Heys | A47J 31/44 |

(Continued)

FOREIGN PATENT DOCUMENTS

| | | |
|---|---|---|
| KR | 101281648 | 7/2013 |
| KR | 101661455 B1 | 9/2016 |

(Continued)

*Primary Examiner* — Sean M Michalski
(74) *Attorney, Agent, or Firm* — Revolution IP, PLLC

(57) ABSTRACT

The present invention relates to a device configured to allow a hot water nozzle and a dripper to move relatively in three axial directions in a space in order to replicate the movement of a barista extracting a pour over coffee, the device comprising: a horizontal transport part for operating a head case so that the nozzle is transported along the radial direction of the dripper; a rotational operation part for operating so as to support the bottom surface of the dripper and to rotate same; and an elevation operation part for operating so as to vertically transport the rotational operation part.

4 Claims, 13 Drawing Sheets

(56) References Cited

U.S. PATENT DOCUMENTS

| | | | | |
|---|---|---|---|---|
| 10,143,331 B1* | 12/2018 | Heys | ............... | A47J 31/46 |
| 10,813,488 B2* | 10/2020 | Lavie | ............... | A23L 2/54 |
| 11,812,889 B2* | 11/2023 | Lavie | ............... | A23L 2/54 |
| 12,059,092 B2* | 8/2024 | Kwag | ............... | A47J 31/24 |
| 2003/0029322 A1* | 2/2003 | Rolland | ............... | A47J 31/44 |
| | | | | 99/279 |
| 2009/0317519 A1* | 12/2009 | Lavie | ............... | A23L 2/58 |
| | | | | 705/50 |
| 2012/0183659 A1* | 7/2012 | Hulett | ............... | A47J 31/46 |
| | | | | 426/431 |
| 2014/0165848 A1 | 6/2014 | Sachtleben | | |
| 2014/0272047 A1* | 9/2014 | Rosati | ............... | A47J 31/4403 |
| | | | | 426/431 |
| 2015/0075387 A1* | 3/2015 | Lee | ............... | A47J 31/46 |
| | | | | 99/289 R |
| 2015/0289712 A1* | 10/2015 | Choi | ............... | A47J 31/54 |
| | | | | 99/300 |
| 2019/0274473 A1* | 9/2019 | Kim | ............... | A47J 31/465 |
| 2020/0337493 A1* | 10/2020 | Chen | ............... | A47J 31/56 |
| 2021/0345814 A1* | 11/2021 | Kwag | ............... | A47J 31/0631 |
| 2021/0345820 A1* | 11/2021 | Kwag | ............... | A47J 31/0631 |

FOREIGN PATENT DOCUMENTS

| | | | |
|---|---|---|---|
| KR | 1020160121202 A | 10/2016 | |
| KR | 101766124 B1 | 8/2017 | |

* cited by examiner

[FIG. 1]
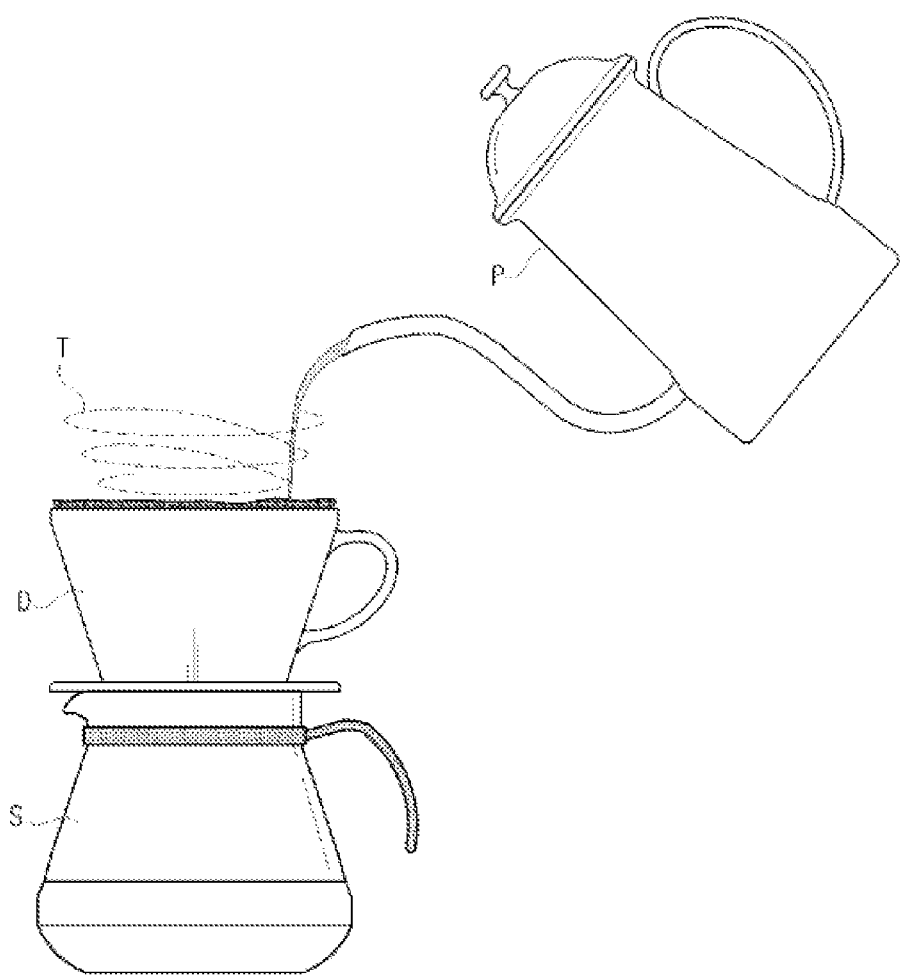

[FIG. 2]
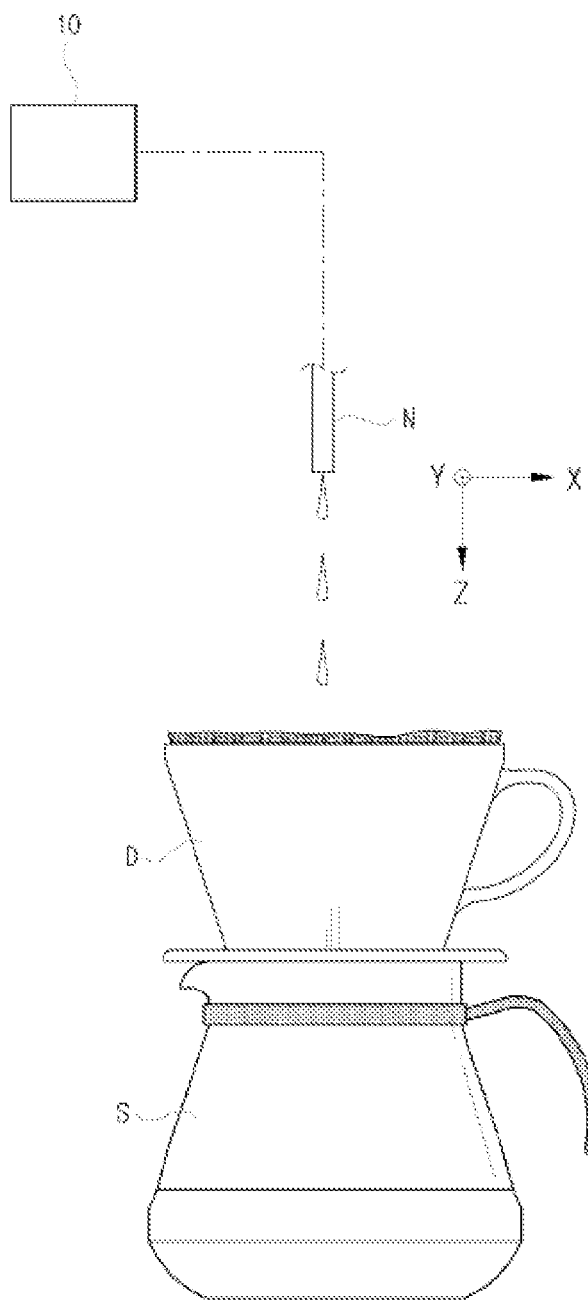

[FIG. 3]
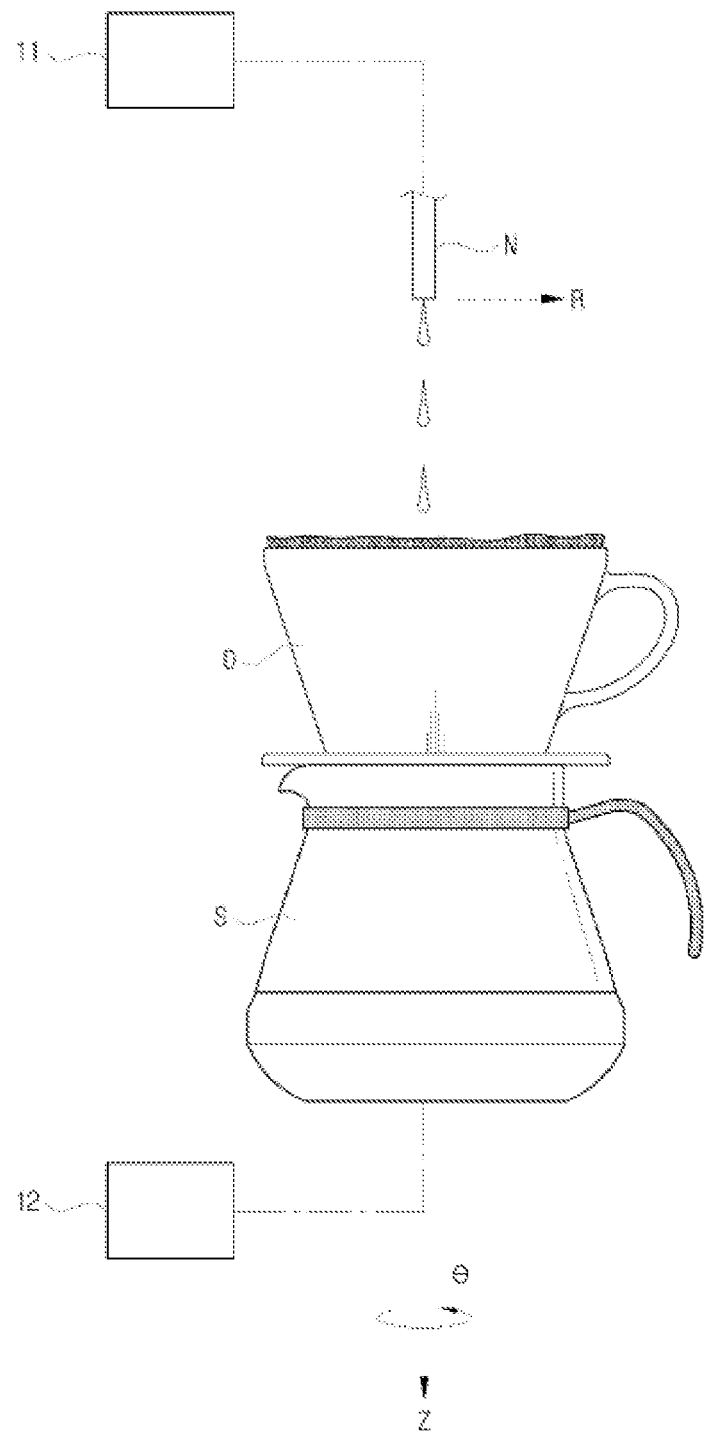

[FIG. 4]
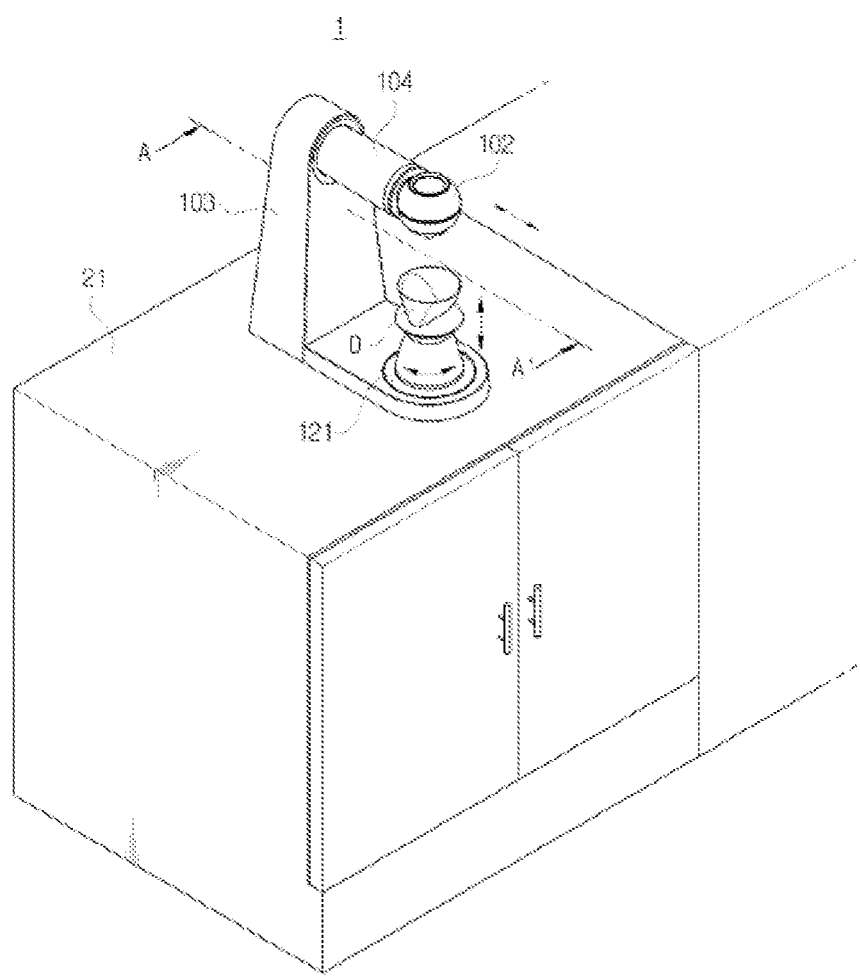

[FIG. 5]
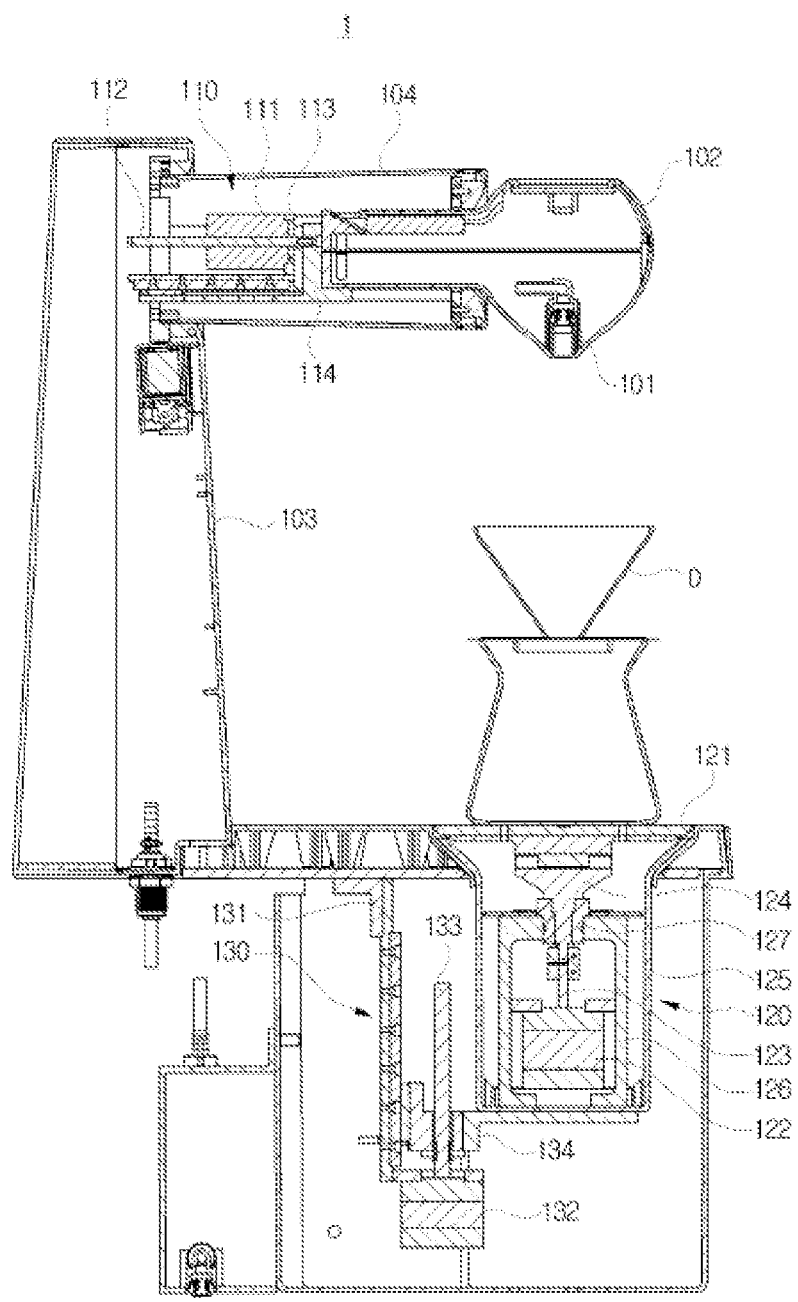

[FIG. 6]
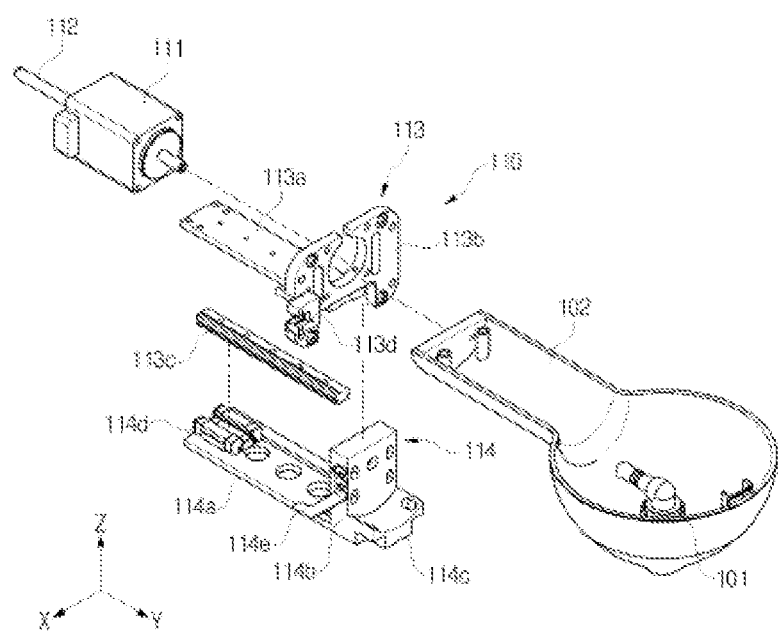

[FIG. 7]
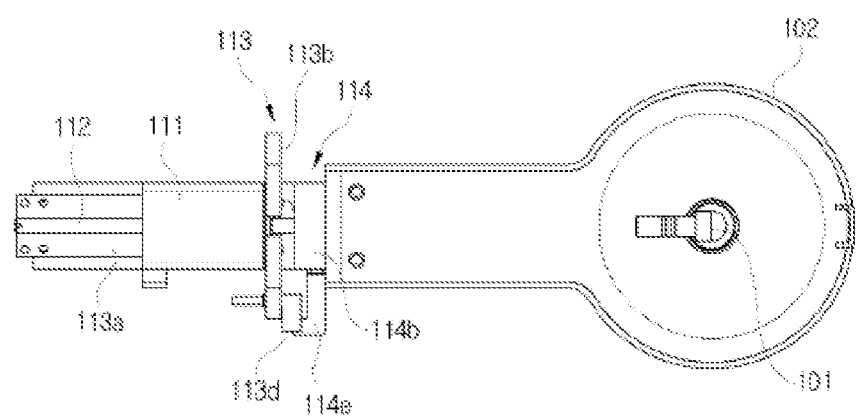
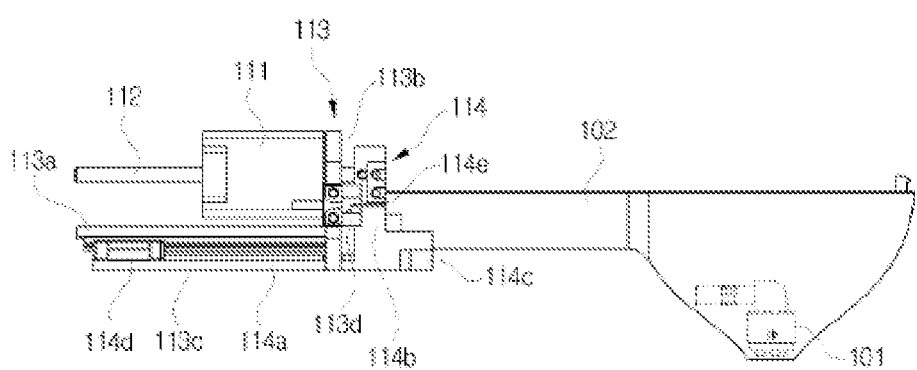

[FIG. 8]
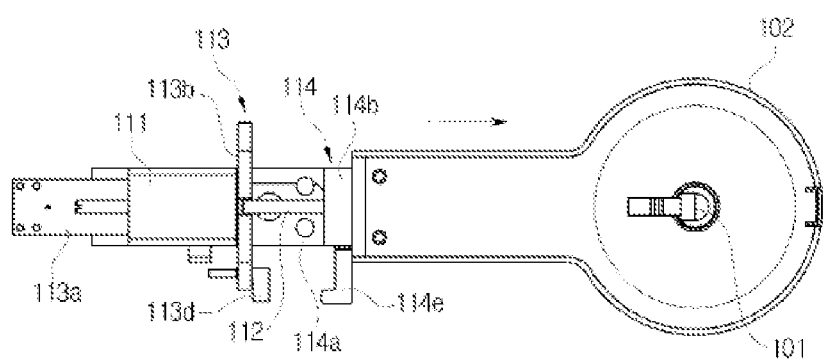
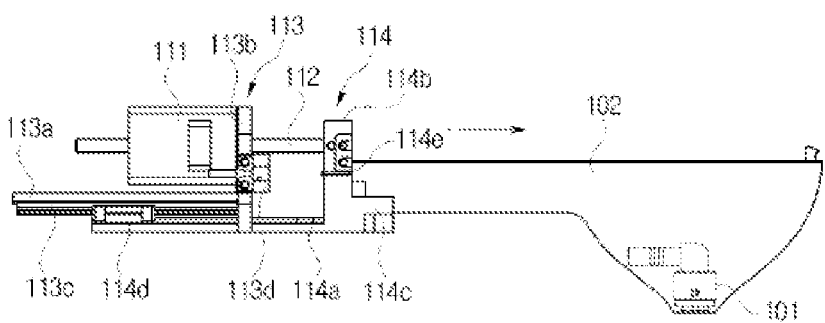

[FIG. 9]
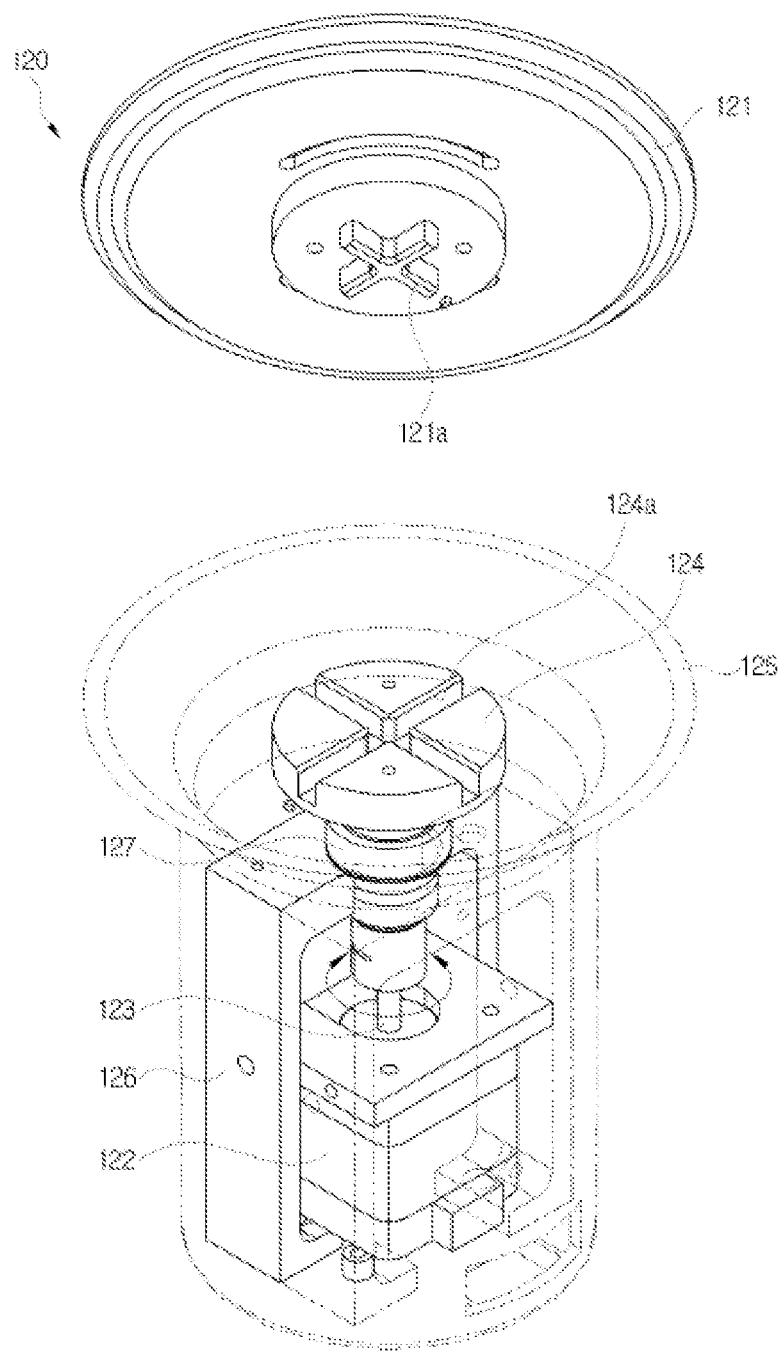

[FIG. 10]
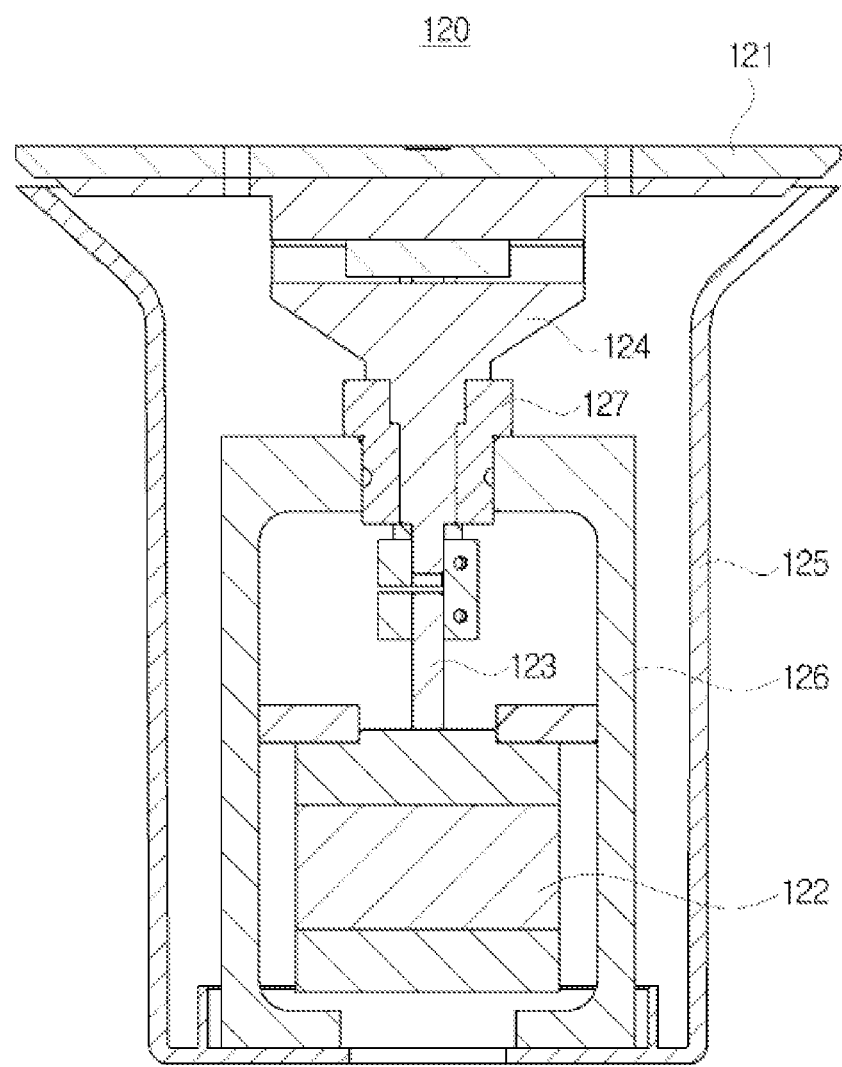

[FIG. 11]
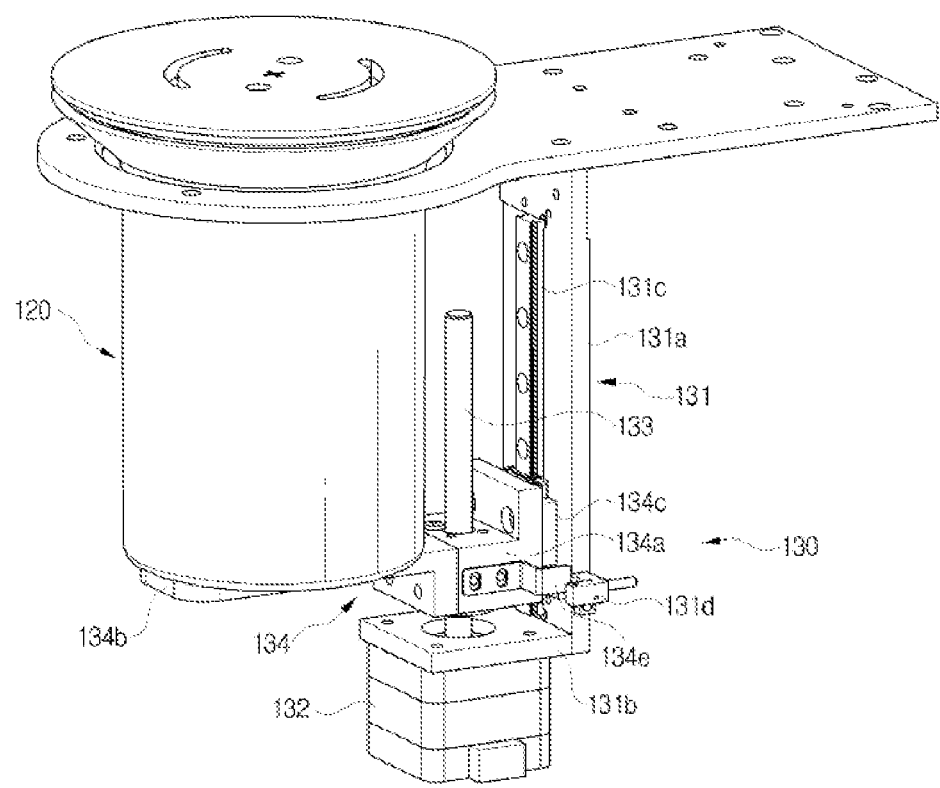

[FIG. 12]
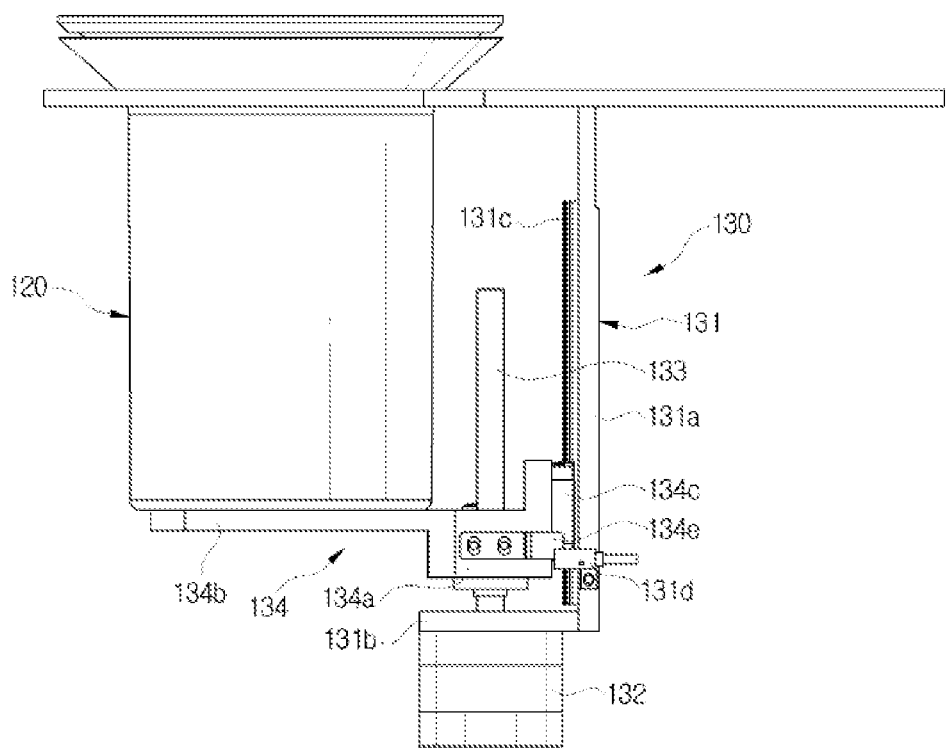

[FIG. 13]
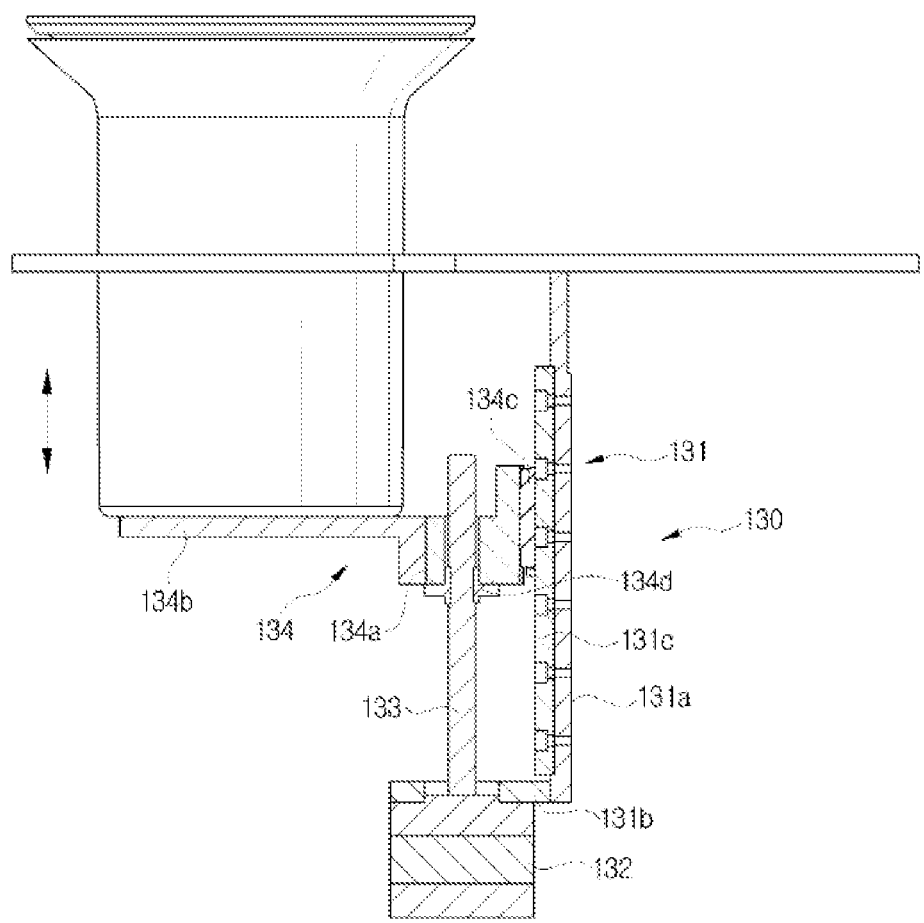

POUR OVER COFFEE EXTRACTION DEVICE

TECHNICAL FIELD

The present invention relates to a pour over coffee extraction device, and more particularly, to a device configured to allow a hot water nozzle and a dripper to move relative to each other in three axial directions in a space in order to replicate a movement of a barista extracting pour over coffee.

BACKGROUND ART

Espresso coffee that is generally provided in coffee shops may be rapidly extracted by using a pressure, so that a large amount of coffee may be provided within a short time. Due to such characteristics, the espresso coffee has enabled popularization of brewed coffee, and most coffee shops have provided coffee drinks based on the espresso coffee. However, since the espresso coffee is usually extracted with steam at a high pressure of 9 atmospheres or higher, bad ingredients of coffee beans may also be extracted, and a bitter taste is too strong. People who intend to enjoy coffee having a softer and milder taste have recently moved to pour over coffee or water drip coffee (Dutch coffee).

Pour over is a scheme of extracting coffee using gravity by slowly pouring hot water on pulverized coffee beans, which is a scheme capable of extracting coffee having a taste and an aroma that are deeper and softer as compared with the espresso coffee. In addition, a user may freely adjust a temperature and an amount of water, a water stream thickness, a water pouring time, a water pouring interval, a water pouring trajectory, and the like, so that coffee having various tastes and aromas may be extracted. However, since the user has to pour the water directly to extract the coffee, the pour over scheme has inconvenient procedures and takes a long time, so that the pour over scheme is a coffee extraction scheme that is difficult to be popularized. Recently, baristas have been attempting to extract and provide pour over coffee directly in some coffee shops, but it is difficult to replace the espresso coffee in terms of a manufacturing time or a unit cost.

An object of the present invention is to provide a pour over coffee extraction device capable of automatically extracting pour over coffee so that the pour over coffee may be popularized. As one example of the related art for automatically extracting pour over coffee, Korean Patent Registration No. 10-1281648 (registered on Jun. 27, 2013, patentee—Kyungpook National University Industry-Academic Cooperation Foundation) discloses a pour over coffee machine including: a hopper in which coffee powder is accommodated; a disc disposed on an upper side of the hopper, and having a screw groove extending in a radial direction; a driving motor having a rotation shaft, and installed in a central portion of the disc; a rotor connected to the rotation shaft, and having an elongated groove extending in a longitudinal direction; a dripper slidably mounted in the elongated groove of the rotor to move in a spiral shape along the screw groove of the disc when the rotor rotates; and a water tank for supplying water to the dripper. Such a conventional pour over coffee machine is implemented to extract pour over coffee similarly to a scheme of extracting pour over coffee by a barista.

However, according to the conventional pour over coffee machine, a hot water drop trajectory is implemented as the screw groove of the disc, so that the drop trajectory may not be changed. In other words, although a hot water drop trajectory that may obtain the best taste varies depending on a type of coffee beans, this may not be reflected.

In addition, according to the conventional pour over coffee machine, components for inducing a transport movement of a drip nozzle 520, such as the driving motor 300, the rotor 400, and a sliding piece 530, are located in an upper portion of the hopper, that is, an upper portion of the pour over coffee machine, so that an overall center of gravity is located in the upper portion of the machine, resulting in structural instability of the machine.

In addition, according to the conventional pour over coffee machine, the rotor 400 and the sliding piece 530 are located in a vertical upper portion of the hopper. Since a portion of an area of the disc 200 is opened through the screw groove 210, there is a risk that foreign substances, lubricating oil, or the like may be dropped onto the hopper from the rotor 400 and the sliding piece 530, which perform a sliding movement.

DETAILED DESCRIPTION OF THE INVENTION

Technical Problem

To solve the above-described problems of the related art, an object of the present invention is to provide a pour over coffee extraction device configured to allow a dripper filled with coffee beans and a nozzle for dropping hot water on the dripper to move relative to each other in three axial directions in a space, so that a movement of a barista extracting pour over coffee may be replicated.

In addition, an object of the present invention is to provide a pour over coffee extraction device configured to allow a mechanical device that causes a relative movement between the dripper and the nozzle to be arranged in a physically stable state, so that an operation may be smoothly performed.

Further, an object of the present invention is to provide a pour over coffee extraction device, which is hygienically safe, and capable of preventing foreign substances from being dropped on the dripper filled with coffee beans.

Technical Solution

To achieve the objects described above, according to the present invention, a pour over coffee extraction device for extracting coffee by dropping hot water onto a dripper filled with pulverized coffee beans includes: a transport part for operating a nozzle and a dripper such that the nozzle for dropping the hot water moves relative to the dripper in all three axial directions in a space, wherein the transport part includes a first transport part for operating the nozzle, and a second transport part for operating the dripper.

In addition, the first transport part may be configured to transport the nozzle in two axial directions on a horizontal plane, and the second transport part may be configured to elevate the dripper in a vertical direction.

In addition, the first transport part may be configured to linearly transport the nozzle in one axial direction along a radial direction of the dripper, and the second transport part may be configured to rotate the dripper on a horizontal plane and elevate the dripper in a vertical direction.

In addition, the second transport part may include a rotational operation part for rotating the dripper on the horizontal plane, and an elevation operation part for elevating the dripper.

In addition, the rotational operation part may support the elevation operation part so that the dripper and the elevation operation part are elevated integrally with each other.

To achieve the objects described above, according to another aspect of the present invention, a pour over coffee extraction device includes: a nozzle for supplying hot water from an upper portion of a dripper; a head case in which the nozzle is mounted; a horizontal transport part for operating the head case such that the nozzle is transported along a radial direction of the dripper; a rotational operation part for supporting a bottom surface of the dripper to rotate the dripper; and an elevation operation part for vertically transporting the rotational operation part, wherein a relative movement between the nozzle and the dripper in a space is caused by operations of the horizontal transport part, the rotational operation part, and the elevation operation part.

In addition, the pour over coffee extraction device may further include: a lateral support for supporting the head case in a horizontal direction such that the head case moves forward and rearward in the horizontal direction; and a pillar part for supporting the lateral support at a predetermined height above a counter in which the pour over coffee extraction device is installed.

In addition, the horizontal transport part may include: a first fixed frame supported to have a fixed position; a first sliding frame installed to move relative to the first fixed frame; a first actuator for generating a driving force for operating the first sliding frame; a movable shaft coupled to the first sliding frame to move forward and rearward by the first actuator; a first position detection sensor installed on the first fixed frame to detect a reference position of the first sliding frame; and a first sensor bracket installed on the first sliding frame, and the head case may be coupled to the first sliding frame to operate integrally with the first sliding frame.

In addition, the rotational operation part may include: a rotation support for supporting the bottom surface of the dripper; a second actuator for rotating the rotation support; a first rotation shaft rotated by the second actuator; and a connection block for connecting the first rotation shaft to the rotation support, and the connection block may be shaped such that an upper end of the connection block, which supports the rotation support, is expanded.

In addition, the elevation operation part may include: a second fixed frame supported to have a fixed position; a second sliding frame installed to move relative to the second fixed frame in a vertical direction; a third actuator for generating a driving force for operating the second sliding frame; a second rotation shaft rotated by the third actuator, and screw-coupled to the second fixed frame to elevate the second sliding frame in a rotation direction;

a second position detection sensor installed on the second fixed frame to detect a reference position of the second sliding frame; and a second sensor bracket installed on the second sliding frame, and the second sliding frame may include a horizontal extension portion for supporting the rotational operation part so that the second sliding frame and the rotational operation part are elevated integrally with each other by an operation of the third actuator.

Advantageous Effects

According to the pour over coffee extraction device of the present invention, a relative position between the nozzle and the dripper may be changed in all directions in the space. In other words, a hand movement of the barista can be replicated.

In addition, even under a condition that the dripper is restricted so as not to move in the horizontal direction, only the horizontal transport part may be provided in an upper portion of the device, and the rotational operation part and the elevation operation part may be provided in a lower portion of the device, so that the device can be structurally stabilized.

In addition, the head case may move above the dripper during a coffee extraction process, so that there is no risk of dropping foreign substances onto the dripper, which occurs when components inside a conventional machine are exposed toward a dripper. Further, a user can visually recognize a movement of the head case during extraction of coffee.

DESCRIPTION OF THE DRAWINGS

FIG. 1 is a view schematically showing a movement of a drip pot performed by a barista extracting pour over coffee.

FIG. 2 is a view showing a pour over coffee extraction device according to a first embodiment of the present invention.

FIG. 3 is a view showing a pour over coffee extraction device according to a second embodiment of the present invention.

FIG. 4 is a perspective view showing a pour over coffee extraction device according to a third embodiment of the present invention.

FIG. 5 is a sectional view taken along line A-A' of FIG. 4.

FIG. 6 is an exploded perspective view showing a horizontal transport part and a peripheral configuration thereof of the pour over coffee extraction device according to the third embodiment of the present invention.

FIG. 7 is a plan view and a side view showing the horizontal transport part and the peripheral configuration thereof of the pour over coffee extraction device according to the third embodiment of the present invention.

FIG. 8 is a plan view and a side view showing a state in which a head case is transported by an operation of the horizontal transport part of the pour over coffee extraction device according to the third embodiment of the present invention.

FIG. 9 is an exploded perspective view showing a rotational operation part of the pour over coffee extraction device according to the third embodiment of the present invention.

FIG. 10 is a sectional view showing the rotational operation part of the pour over coffee extraction device according to the third embodiment of the present invention.

FIG. 11 is a perspective view showing an elevation operation part and a peripheral configuration thereof of the pour over coffee extraction device according to the third embodiment of the present invention.

FIG. 12 is a side view showing the elevation operation part and the peripheral configuration thereof of the pour over coffee extraction device according to the third embodiment of the present invention.

FIG. 13 is a sectional side view showing a state in which the rotational operation part is transported by an operation of the elevation operation part of the pour over coffee extraction device according to the third embodiment of the present invention.

BEST MODE

Hereinafter, various embodiments of the present invention will be described in detail with reference to the drawings. Various modifications can be made to the following embodiments by a person having ordinary skill in the art to which the present invention pertains. The descriptions of the following embodiments are not intended to limit the present invention to the embodiments. It should be understood that the present invention includes various modifications, substitutions, and equivalents within the scope of the technical idea understood from the entire present disclosure as well as the following embodiments.

It should be understood that expressions such as "comprising", "including", and "having" that may be used below do not preclude additional elements or functions.

Expressions such as "first", "second", "firstly", and "secondly" that may be used below should not be construed as limiting an order, importance, or the like between elements unless explicitly stated otherwise.

It should be understood that expressions such as "coupled" and "connected" that may be used below may indicate a case where another element is present or interposed between elements as well as a case of direct coupling or connection unless explicitly stated otherwise.

As used herein, it should be understood that expressions in a singular form does not preclude a meaning of a plural form unless explicitly stated otherwise.

Pour over is a scheme of extracting coffee by pouring hot water on coffee beans, which are ground after roasting, several times. As described above, there have been proposals for ideas for extracting pour over coffee, but a pour over coffee extraction device has not yet been popularly spread. There may be various reasons, and one factor may be that a technology that may replicate a hand technique of a barista, which determines a taste of the coffee, is not developed.

The barista may finely adjust several factors of a water pouring operation in order to obtain the best taste of coffee. These factors may be, for example, a water stem thickness, a swing direction (a clockwise or counterclockwise direction), a head of water (a height difference between a drip pot and a dripper), an amount of water for one water pouring operation, or the like.

The present invention relates to a device capable of replicating a hand movement of a barista extracting pour over coffee, and more particularly, to a device configured to replicate a movement of a drip pot that drops hot water onto a dripper.

Referring to FIG. 1, during a coffee extraction process, the barista may pour water while moving a drip pot P such that a spout of the drip pot P may draw a circular trajectory T above a dripper D filled with pulverized coffee beans. The barista may vertically move the drip pot P to adjust a head of water dropped onto the dripper D as well as move the drip pot P such that the drip pot P may draw a circle on a horizontal plane.

The present invention proposes a device capable of replicating the above-described hand movement of the barista extracting the pour over coffee.

First Embodiment

Referring to FIG. 2, according to one embodiment of the present invention, a pour over coffee extraction device may include a nozzle N for dropping hot water onto the dripper D, and a transport part 10 for operating the nozzle N. Although not shown, the pour over coffee extraction device may further include a hot water supply device for providing the hot water to be dropped through the nozzle N.

The nozzle N may be disposed above the dripper D to supply the hot water from an upper portion of the dripper D. The transport part 10 may be configured to transport the nozzle N in three axial directions of an X-axis, a Y-axis, and a Z-axis in a space. The transport part 10 may be configured to transport the nozzle N in a vertical direction (Z-axis direction) as well as transport the nozzle N on a horizontal plane (X-Y plane), so that the movement of the drip pot performed by the barista may be replicated. The transport part 10 may include at least three actuators for providing transport driving forces in the three axial directions, respectively, and power transmission components for transmitting the driving forces of the actuators to the nozzle N.

Second Embodiment

According to the first embodiment, the pour over coffee extraction device is configured such that water pouring for coffee extraction is performed by transporting the nozzle N while the dripper D is placed on a floor. However, a pour over coffee extraction movement of the barista may be replicated by operating both the nozzle N and the dripper D to cause a relative movement between the nozzle N and the dripper D.

For example, according to another embodiment shown in FIG. 3, a pour over coffee extraction device may include a first transport part 11 for operating the nozzle N, and a second transport part 12 for operating the dripper D. The first transport part 11 and the second transport part 12 may be configured to operate the nozzle N and the dripper D in at least one axial direction in the space, respectively. For example, the first transport part 11 may be configured to transport the nozzle N on the horizontal plane (X-Y plane), and the second transport part 12 may be configured to transport the dripper D in the vertical direction (Z-axis direction).

A drip server S for storing the extracted pour over coffee may be placed under the dripper D. It is not preferable to transport the dripper D and the drip server S, which are placed integrally with each other, in a horizontal direction. This is because there is a risk that the coffee stored in the drip server S may spill out or the dripper D may be tilted to fall (Hereinafter, the term "dripper D" will be used as a term that denotes an entire set of drip devices including the drip server S). Therefore, it is preferable to configure the first transport part 11 and the second transport part 12 under a condition that the dripper D is restricted so as not to be transported in the horizontal direction.

As a typical movement for extraction of pour over coffee, the nozzle N is required to draw circles having various radii that are large and small on the horizontal plane with respect to the dripper D. Such a circular movement may be implemented by the first transport part 11 for operating the nozzle N. In other words, the first transport part 11 may include at least two actuators, and power transmission components for transmitting operations of the actuators to the nozzle N. However, when a biaxial power transmission device is implemented in the first transport part 11, the configuration of the device may become complicated, and the number of components disposed above the dripper D may be increased so that the components disposed above the dripper D become heavy.

In order to cause a relative circular movement between the nozzle N and the dripper D under the condition that horizontal transport of the dripper D is restricted, it is most preferable that the first transport part 11 is configured to linearly move the nozzle N in one axial direction, and the second transport part 12 is configured to rotate the dripper D. In other words, the second transport part 12 may be configured to rotate and elevate the dripper D in place.

As shown in FIG. 3, the first transport part 11 is preferably configured to transport the nozzle N in a radial direction (R direction) of the dripper D, and the second transport part 12 is preferably configured to rotate the dripper D about a central axis of the dripper D (θ direction), and elevate the dripper D in the vertical direction (Z-axis direction).

Third Embodiment

Hereinafter, an embodiment including a more detailed mechanical configuration of a pour over coffee extraction device according to the present invention will be described.

Referring to FIGS. 4 and 5, a pour over coffee extraction device 1 according to the present invention may be installed so as to be exposed on an upper plate of a counter 21 having a predetermined internal space. The pour over coffee extraction device 1 may include a rotation support 121 on which the dripper D is to be placed, and a nozzle 101 for dropping hot water onto the dripper D. The nozzle 101 may be installed at a height spaced upward from the rotation support 121 by a predetermined distance. The nozzle 101 may be mounted in a head case 102, and an end of the nozzle 101 may be exposed downward through a bottom surface of the head case 102.

The pour over coffee extraction device 1 may include a pillar part 103 for providing a vertical support function, and a lateral support 104 extending laterally from one upper side of the pillar part 103. The head case 102 may be coupled to a front end of the lateral support 104. The head case 102 may be installed to move forward and rearward in one horizontal direction on the lateral support 104. A horizontal transport part 110 for causing the forward and rearward movement of the head case 102 may be provided inside the lateral support 104.

The rotation support 121 may provide a function of rotating the dripper D, which is placed on the rotation support 121, in place on the horizontal plane. A rotational operation part 120 for rotating the rotation support 121 and an elevation operation part 130 for elevating the rotational operation part 120 may be provided under the rotation support 121. The rotational operation part 120 and the elevation operation part 130 may be mounted in the counter 21 under upper plate of the counter 21 so as not to be exposed to an outside.

The horizontal transport part 110 may operate the head case 102 such that the head case 102 is linearly transported in one direction. The head case 102 may be configured to move along a radial direction of the rotation support 121. A position in which the hot water is dropped from the nozzle 101 onto the dripper D may vary according to a position of the moving head case 102.

Referring to FIGS. 6 and 7, the horizontal transport part 110 may include a first actuator 111 for generating a driving force required for a transport operation, and a movable shaft 112 configured to move forward and rearward by the first actuator 111. The first actuator 111 may be installed on a fixed frame 113 supported to have a fixed position. The fixed frame 113 may include a horizontal plate portion 113a for supporting a bottom surface of the first actuator 111, and a vertical plate portion 113b coupled to one end of the horizontal plate portion 113a so as to be orthogonal to the horizontal plate portion 113a. The vertical plate portion 113b may be coupled to a front (Y-axis direction of FIG. 6) end of the horizontal plate portion 113a. The vertical plate portion 113b may be formed at a center thereof with a hole, so that the movable shaft 112 may be installed through the hole.

A sliding frame 114 may be provided under the fixed frame 113. The sliding frame 114 may be installed so as to be slidable in a front-rear direction (Y-axis direction of FIG. 6) on the fixed frame 113. One end of the movable shaft 112 may be fixed to the sliding frame 114, and the sliding frame 114 may be transported integrally with the movable shaft 112 according to the forward and rearward movement of the movable shaft 112. The sliding frame 114 may include a horizontal plate portion 114a disposed in parallel with a bottom surface of the fixed frame 113, a vertical plate portion 114b formed upright at a front end of the horizontal plate portion 114a, and a front extension portion 114c protruding forward from the vertical plate portion 114b.

A guide rail 113c may be installed on a bottom surface of the horizontal plate portion 113a of the fixed frame 113 in the front-rear direction to guide a relative movement between the fixed frame 113 and the sliding frame 114, and a sliding block 114d configured to slidably move on the guide rail 113c may be coupled to a top surface of the horizontal plate portion 114a of the sliding frame 114.

A rear end of the head case 102 may be coupled to a front side of the sliding frame 114. The rear end of the head case 102 may be supported by a front surface of the vertical plate 114b and a top surface of the front extension portion 114c of the sliding frame 114. The head case 102 may be transported integrally with the sliding frame 114 in the front-rear direction.

A position detection sensor 113d may be installed on one side of a periphery of the vertical plate 113b of the fixed frame 113 to control a position of the sliding frame 114. According to the present embodiment, the position detection sensor 113d may be a photo sensor. The position detection sensor 113d may detect whether the sliding frame 114 is placed on a reference position for position control. A sensor bracket 114e may be provided on one side of the sliding frame 114. The sensor bracket 114e may have a shape protruding rearward, and the position detection sensor 113d may detect whether a position at which an end of the sensor bracket 114e is inserted into a sensor groove of the position detection sensor 113d has been reached.

FIG. 8 is a view showing a state in which the sliding frame 114 is transported forward from the reference position by a predetermined distance. When the movable shaft 112 moves forward and rearward by an operation of the first actuator 111 of the horizontal transport part 110, the sliding frame 114 and the head case 102 may move integrally with each other.

The rotational operation part 120 may rotate the dripper D on the horizontal plane. Referring to FIGS. 9 and 10, the rotational operation part 120 may include the rotation support 121, a second actuator 122 for generating a rotational driving force, a rotation shaft 123 driven by the second actuator 122, and a connection block 124 for transmitting a rotational movement of the rotation shaft 123 to the rotation support 121.

The second actuator 122 may be controlled to rotate the dripper D. The second actuator 122 may rotate the rotation shaft 123, and the rotational operation may be transmitted to the rotation support 121 through the connection block 124. The connection block 124 may be shaped such that an upper end of the connection block 124 is expanded, and may be formed at a top surface thereof with a top surface groove 124a having a cross shape. The rotation support 121 may be formed at a bottom surface thereof with a bottom surface protrusion portion 121a, which protrudes in a cross shape so as to be inserted into the top surface groove 124a. The bottom surface protrusion portion 121a may be inserted into the top surface groove 124a. Since the connection block 124 is shaped such that the upper end of the connection block 124 is expanded, an area through which a force is transmitted to the rotation support 121 may be enlarged, and a load may be prevented from being concentrated at a center of the rotation support 121.

The rotational operation part 120 may include a casing 125 surrounding a side surface and a lower portion of the rotational operation part 120, and a support frame 126 fixed to an inside of the casing 125. The second actuator 122 and the connection block 124 may be installed on the support frame 126. In addition, a bushing 127 may be interposed between the connection block 124 and the support frame 126.

The rotational operation part 120 may rotate the dripper D so that the hot water dropped from the nozzle 101 may draw a circular trajectory.

The elevation operation part 130 may vertically elevate the rotational operation part 120 on which the dripper D is placed.

Referring to FIGS. 11 to 13, the elevation operation part 130 may include a fixed frame 131 supported to have a fixed position, a third actuator 132 installed on the fixed frame 131, a rotation shaft 133 rotated by the third actuator 132, and a sliding frame 134 elevated according to a rotational movement of the rotation shaft 133.

The fixed frame 131 may include a vertical plate portion 131a that is vertically placed, and a horizontal plate portion 131b extending horizontally from a lower end of the vertical plate portion 131a. The third actuator 132 may be fixed to the horizontal plate portion 131b, and the rotation shaft 133 may be exposed to an upper portion of the horizontal plate portion 131b to extend vertically.

The sliding frame 134 may be installed so as to be vertically slidable on the fixed frame 131. The sliding frame 134 may include a main portion 134a through which the rotation shaft 133 is installed, and a horizontal extension portion 134b extending horizontally from the main portion 134a to support a bottom surface of the rotational operation part 120.

A guide rail 131c may be installed on one surface of the vertical plate portion 131a of the fixed frame 131 in the vertical direction to guide a sliding movement between the fixed frame 131 and the sliding frame 134, and a sliding block 134c configured to slidably move on the guide rail 131c may be coupled to one surface of the sliding frame 134 facing the fixed frame 131.

In addition, a position detection sensor 131d may be installed at one point of a lower end of the fixed frame 131 to control a position of the sliding frame 134. The position detection sensor 131d may be a photo sensor. A sensor bracket 134e may be provided on one side of the sliding frame 134. The sensor bracket 134e may have a protruding shape so as to be inserted into a sensor groove of the position detection sensor 131d. The position detection sensor 131d may detect whether the sensor bracket 134e is inserted in the sensor groove to detect whether the sliding frame 134 has reached a reference position.

A screw thread may be formed on an outer peripheral surface of the rotation shaft 133, and a female thread portion 134d fastened to the screw thread of the rotation shaft may be formed on an inner peripheral surface of the main portion 134a of the sliding frame 134. The sliding frame 134 may receive a force for vertically transporting the sliding frame 134 by the rotational movement of the rotation shaft 133. As the sliding frame 134 moves vertically, the entire rotational operation part 120 supported by the horizontal extension portion 134b may be vertically elevated. FIG. 13 is a view showing a state in which the rotational operation part 120 is lifted by an elevation movement of the sliding frame 134.

The pour over coffee extraction device 1 according to the present invention configured as described above may replicate the movement of the barista by individually controlling the first, second, and third actuators 111, 122, and 132. In more detail, the hot water nozzle 101 may move forward and rearward in the radial direction with respect to the dripper D under the control of the first actuator 111, the dripper D may be rotated under the control of the second actuator 122, and the dripper D may be elevated under the control of the third actuator. A relative position between the nozzle 101 and the dripper D may be changed in all directions in the space by a combination of the above three movements. In other words, the hand movement of the barista may be replicated.

Meanwhile, even under a condition that the dripper D is restricted so as not to move in the horizontal direction, only the horizontal transport part 110 may be provided in an upper portion of the device, and the rotational operation part 120 and the elevation operation part 130 may be provided in a lower portion of the device, so that the device may be structurally stabilized.

In addition, the head case 102 may move above the dripper during the coffee extraction process, so that there is no risk of dropping foreign substances onto the dripper D, which occurs when components inside a conventional machine are exposed toward the dripper D. Further, a user may visually recognize the movement of the head case 102.

INDUSTRIAL APPLICABILITY

The pour over coffee extraction device according to the present invention may be widely used in a coffee extraction device industry and a coffee beverage industry.

The invention claimed is:

1. A pour over coffee extraction device comprising:
a nozzle for supplying hot water from an upper portion of a dripper;
a head case in which the nozzle is mounted;
a horizontal transport part for operating the head case such that the nozzle is transported along a radial direction of the dripper;
a rotational operation part for supporting a bottom surface of the dripper to rotate the dripper;
an elevation operation part for vertically transporting the rotational operation part;
a lateral support for supporting the head case in a horizontal direction such that the head case moves forward and rearward in the horizontal direction; and
a pillar part for supporting the lateral support at a predetermined height above a counter in which the pour over coffee extraction device is installed,
wherein a relative movement between the nozzle and the dripper in a space is caused by operations of the horizontal transport part, the rotational operation part, and the elevation operation part.

2. The pour over coffee extraction device of claim 1, wherein the horizontal transport part includes:
a first fixed frame supported to have a fixed position;
a first sliding frame installed to move relative to the first fixed frame;

a first actuator for generating a driving force for operating the first sliding frame;

a movable shaft coupled to the first sliding frame to move forward and rearward by the first actuator;

a first position detection sensor installed on the first fixed frame to detect a reference position of the first sliding frame; and a first sensor bracket installed on the first sliding frame, and the head case is coupled to the first sliding frame to operate integrally with the first sliding frame.

3. The pour over coffee extraction device of claim 2, wherein the rotational operation part includes:

a rotation support for supporting the bottom surface of the dripper;

a second actuator for rotating the rotation support;

a first rotation shaft rotated by the second actuator; and a connection block for connecting the first rotation shaft to the rotation support, and the connection block is shaped such that an upper end of the connection block, which supports the rotation support, is expanded.

4. The pour over coffee extraction device of claim 3, wherein the elevation operation part includes:

a second fixed frame supported to have a fixed position;

a second sliding frame installed to move relative to the second fixed frame in a vertical direction;

a third actuator for generating a driving force for operating the second sliding frame;

a second rotation shaft rotated by the third actuator, and screw-coupled to the second fixed frame to elevate the second sliding frame in a rotation direction;

a second position detection sensor installed on the second fixed frame to detect a reference position of the second sliding frame; and a second sensor bracket installed on the second sliding frame, and the second sliding frame includes a horizontal extension portion for supporting the rotational operation part so that the second sliding frame and the rotational operation part are elevated integrally with each other by an operation of the third actuator.

* * * * *